United States Patent
Kou et al.

(10) Patent No.: US 7,078,647 B2
(45) Date of Patent: Jul. 18, 2006

(54) ARC-ENHANCED FRICTION STIR WELDING

(75) Inventors: Sindo Kou, Madison, WI (US); Guoping Cao, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 10/970,058

(22) Filed: Oct. 21, 2004

(65) Prior Publication Data

US 2006/0086707 A1  Apr. 27, 2006

(51) Int. Cl.
*B23K 20/12* (2006.01)

(52) U.S. Cl. .................... 219/75; 228/112.1
(58) Field of Classification Search .............. 219/75, 219/137 R; 228/112.1
See application file for complete search history.

(56) References Cited

U.S. PATENT DOCUMENTS 6,530,513 B1 * 3/2003 Ezumi et al. ............ 228/112.1
6,554,175 B1   4/2003 Thompson
6,715,664 B1 * 4/2004 Yamashita ............... 228/112.1
6,793,118 B1   9/2004 Palm
2004/0046003 A1  3/2004 Vyas
2004/0118899 A1  6/2004 Aota et al.
2004/0173662 A1  9/2004 Christner

FOREIGN PATENT DOCUMENTS

| JP | 2003094175 | 4/2003 |
| WO | WO 98/45080 A1 | 10/1998 |
| WO | WO 99/32254 A1 | 4/1999 |
| WO | WO 99/39861 A1 | 8/1999 |
| WO | WO 02/074479 A1 | 9/2002 |

* cited by examiner

*Primary Examiner*—Clifford C. Shaw
(74) *Attorney, Agent, or Firm*—Craig A. Fieschko, Esq.; DeWitt Ross & Stevens S.C.

(57) ABSTRACT

Friction stir welding is enhanced by preheating of the workpiece with an electrical arc, such as an arc applied by a common gas-tungsten arc welding (GTAW) torch. As the arc is moved about a path on the workpiece, it preheats or partially welds the path, with the friction stir welding head following along the path to complete the weld.

22 Claims, 3 Drawing Sheets

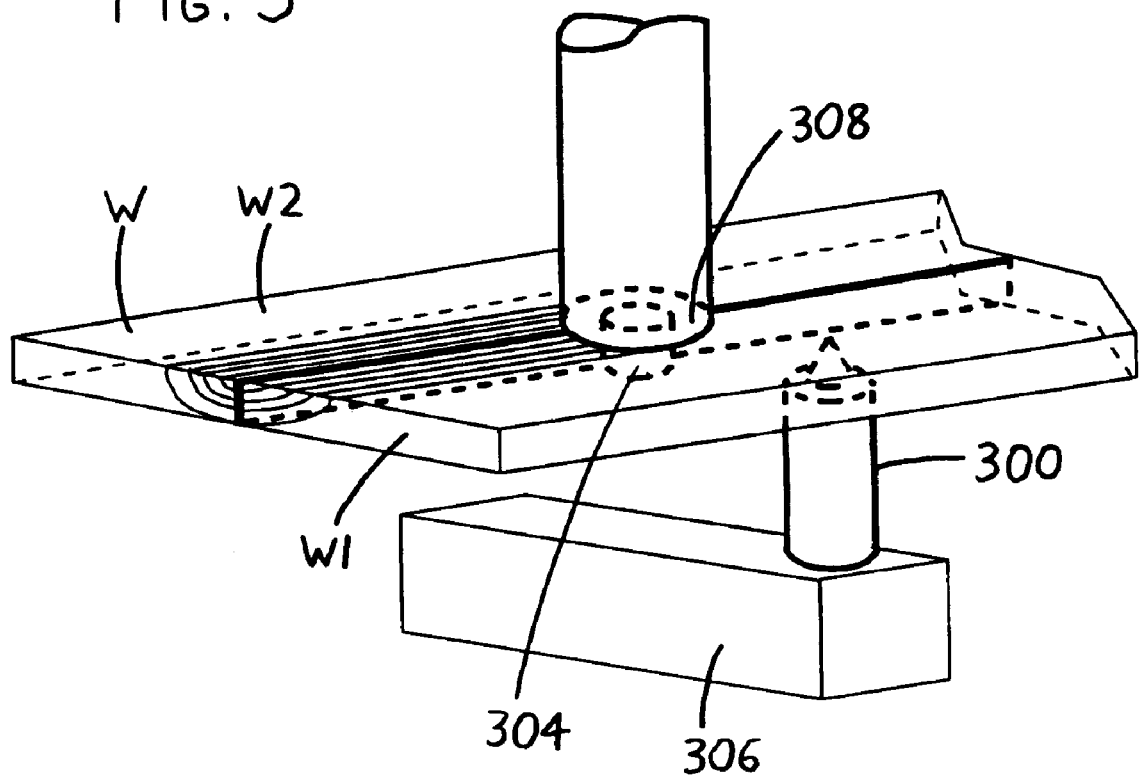

ARC-ENHANCED FRICTION STIR WELDING

STATEMENT REGARDING FEDERALLY SPONSORED RESEARCH

This invention was made with United States government support awarded by the National Science Foundation (NSF) in Grant No. 0098776. The United States has certain rights in this invention.

FIELD OF THE INVENTION

This document concerns an invention relating generally to devices and methods for friction stir welding, and more specifically to devices and methods for reducing tool wear in (and enhancing the versatility of) friction stir welding.

BACKGROUND OF THE INVENTION

Friction stir welding is a welding process exemplified in the accompanying FIG. 1, wherein a rotating friction stir welding tool 100—generally in the form of a cylindrical head 102 extending from a larger-diameter cylindrical shoulder 104—is rapidly rotated and contacted with a workpiece W to generate frictional heat and make the workpiece W plastic. The friction stir welding head 102 is plunged into the workpiece W, usually until its shoulder 104 abuts the surface of the workpiece W, to stir the area to be welded (generally a joint J between two pieces of material W1 and W2). The friction stir welding head 102 may be held in place to accomplish a spot weld, or it may instead be advanced along the joint J to form a linear weld, as by moving one or both of the friction stir welding head 102 and the workpiece W. In the case where the friction stir welding head 102 and the workpiece W are moved relative to each other, the head 102 is said to have an advancing side 106 (a side which moves in the same direction as the direction in which the head 102 moves relative to the workpiece W), and a retreating side (a side which moves in the opposite direction), which is not visible in FIG. 1. Once the weld is complete, the friction stir welding head 102 is removed from the workpiece W. Further details regarding friction stir welding can be found, for example, in U.S. Pat. No. 6,786,388 to Ezumi et al. ("Friction stir welding method"); U.S. Pat. No. 6,783,055 to Ezumi et al. ("Friction stir welding method and rotary tool"); U.S. Pat. No. 6,780,525 to Litwinski ("High strength friction stir welding"); U.S. Pat. No. 6,779,705 to Ezumi et al. ("Friction stir welding method"); U.S. Pat. No. 6,742,696 to Thompson ("Friction stir welding machine"); U.S. Pat. No. 6,722,555 to Ezumi et al. ("Friction stir welding method"); U.S. Pat. No. 6,715,664 to Yamashita ("Friction stir welding method"); U.S. Pat. No. 6,708,867 to Yoshinaga ("Friction stir welding method"); U.S. Pat. No. 6,676,004 to Trapp et al. ("Tool for friction stir welding"); U.S. Pat. No. 6,595,403 to Okamura et al. ("Friction stir welding method"); U.S. Pat. No. 6,554,175 to Thompson ("Friction stir welding machine and method"); U.S. Pat. No. 6,536,651 to Ezumi et al. ("Friction stir welding method"); U.S. Pat. No. 6,499,649 to Sayama et al. ("Friction stir welding apparatus"); U.S. Pat. No. 6,474,533 to Ezumi et al. ("Friction stir welding method"); U.S. Pat. No. 6,471,112 to Satou et al. ("Friction stir welding method"); U.S. Pat. No. 6,419,142 to Larson ("Apparatus for friction stir welding"); U.S. Pat. No. 6,367,681 to Waldron et al. ("Friction stir welding apparatus and method"); U.S. Pat. No. 6,360,937 to De Koning ("Friction stir welding"); U.S. Pat. No. 6,354,483 to Ezumi et al. ("Friction stir welding method"); U.S. Pat. No. 6,315,187 to Satou et al. ("Friction stir welding method"); U.S. Pat. No. 6,302,315 to Thompson ("Friction stir welding machine and method"); U.S. Pat. No. 6,299,050 to Okamura et al. ("Friction stir welding apparatus and method"); U.S. Pat. No. 6,237,829 to Aota et al. ("Friction stir welding apparatus"); U.S. Pat. No. 6,053,391 to Heideman et al. ("Friction stir welding tool"); U.S. Pat. No. 5,813,592 to Midling et al. ("Friction stir welding"); and U.S. Pat. No. 5,794,835 to Colligan et al. ("Friction stir welding").

While friction stir welding is a valuable welding process, particularly for soft and/or thin workpieces, it tends to suffer from the disadvantages that the friction stir welding heads rapidly wear (particularly when harder materials are being welded). Additionally, it is often difficult to accomplish friction stir welding of materials with different melting points or other physical properties.

SUMMARY OF THE INVENTION

The invention involves welding devices and methods which are intended to provide improved friction stir welding of at least some types of metals and workpieces, including workpieces wherein metals of different types are to be joined. To give the reader a basic understanding of some of the advantageous features of the invention, following is a brief summary of preferred versions of the welding devices and methods, which will be described with reference to the accompanying FIGS. 2a-2c and 3. Since this is merely a summary, it should be understood that more details regarding the preferred versions may be found in the Detailed Description set forth elsewhere in this document. The claims set forth at the end of this document then define the various versions of the invention in which exclusive rights are secured.

In a preferred version of the invention exemplified by FIGS. 2a-2c, a welding device includes a torch 200 for supplying an electrical arc 202 to a workpiece W, and a friction stir welding head 204 which frictionally stirs the workpiece W at the location(s) at which the arc 202 is applied. The workpiece W may be a single piece of material or several adjacently situated pieces (here W1 and W2) spaced by joints J to be welded, e.g., butt joints (where the edges of the pieces abut, as shown in FIGS. 2a-2c), lap joints (where the edges of the pieces overlap), or combinations of the two (e.g., tee joints, wherein a butt joint is itself abutted by an edge of another piece of material). The torch 200 and the friction stir welding head 204 are movable with respect to the workpiece W, either by moving the workpiece W relative to the torch 200 and the friction stir welding head 204 (as by situating the workpiece W on a movable mounting bed, not shown), and/or by moving both the torch 200 and the friction stir welding head 204 relative to the workpiece W. The torch 200 and the friction stir welding head 204 thereby travel about the workpiece W to first apply the arc 202 to each location on the workpiece W at which a weld is desired, and then apply frictional stirring. Such a location may simply be a spot, or may instead be an extended line. As an example, the torch 200 may be situated adjacent the joint J of the workpiece W to apply the arc 202, and may then be moved along the joint J (as depicted in FIG. 2a). The friction stir welding head 204, which may be movable with respect to the torch 200 and which may be initially retracted away from the workpiece W (as also depicted in FIG. 2a), may then be moved into at least substantially the same plane at which the arc 202 was initially located, and may then frictionally stir the workpiece W along its joint J where the arc was applied (as depicted in FIG. 2b). The friction stir welding head 204 may then follow the torch 200 so that the locations on the workpiece W which were preheated by the arc 202 are frictionally stirred, thereby completing the weld (as depicted in FIG. 2c). The arc 202 is preferably applied at a voltage and current such that it does not melt the workpiece W, but rather plasticizes it so that less energy input is required by the friction stir welding head 204 to effect stirring. Alternatively, the arc 202 may melt the workpiece W, but in this case the arc 202 strength is preferably such that by the time the friction stir welding head 204 is applied to the arced location, the arced location will have at least partially solidified.

The frictional stirring may be applied by situating the torch 200 and friction stir welding head 204 spaced from each other on the same side of the workpiece W (as depicted in FIGS. 2a–2c), and after the torch 200 supplies the arc 202 to some location(s) on the workpiece W, the friction stir welding head 204 may then be moved onto the location(s) to which the torch 200 supplied the arc 202. In this manner, the friction stir welding head 204 follows the torch 200 about the path it travels across the workpiece W to frictionally stir the location(s) to which the arc 202 was just supplied. Alternatively, as shown in FIG. 3, the frictional stirring may be applied by situating the torch 300 and friction stir welding head 304 spaced from each other by the workpiece W itself, i.e., with the torch 300 and friction stir welding head 304 being on opposite sides of the workpiece W. In this case, the friction stir welding head 304 is preferably slightly spaced from the torch 300 along the plane of the workpiece W so that the friction stir welding head 304 is not directly opposite the torch 300, and it again follows the torch 300 to frictionally stir the location(s) to which the arc (not shown) was just supplied.

Further advantages, features, and objects of the invention will be apparent from the following detailed description of the invention in conjunction with the associated drawings.

BRIEF DESCRIPTION OF THE DRAWINGS

FIG. 3 is a perspective view of a second arc-enhanced friction stir welding arrangement which exemplifies the invention, wherein the torch 300 applies an electrical arc (not shown) to the joint J on one side of the workpiece W, with the joint J also being frictionally stirred by the friction stir welding head 204 on the opposite side of the workpiece W.

DETAILED DESCRIPTION OF PREFERRED VERSIONS OF THE INVENTION

Figure 1:
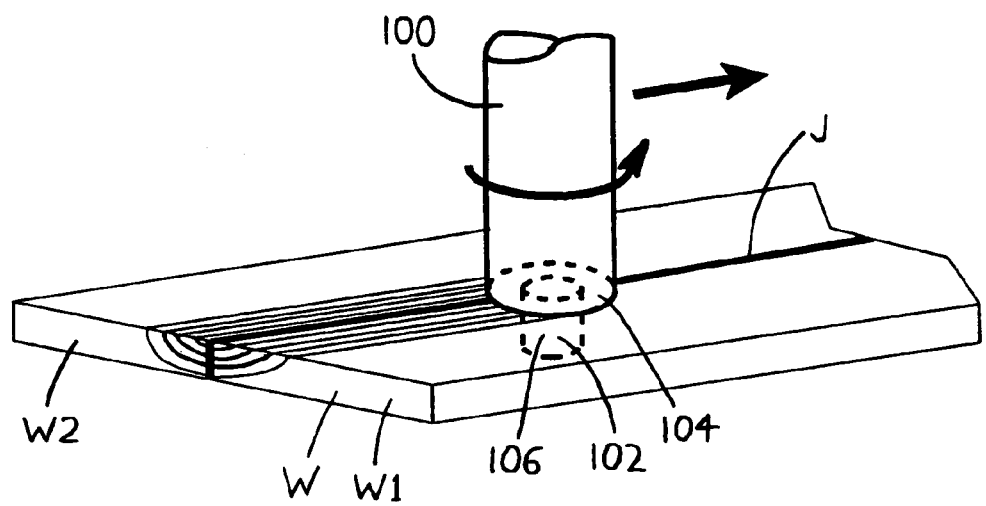
FIG. 1 is a perspective view of a conventional friction stir welding arrangement.
Figure 2A:
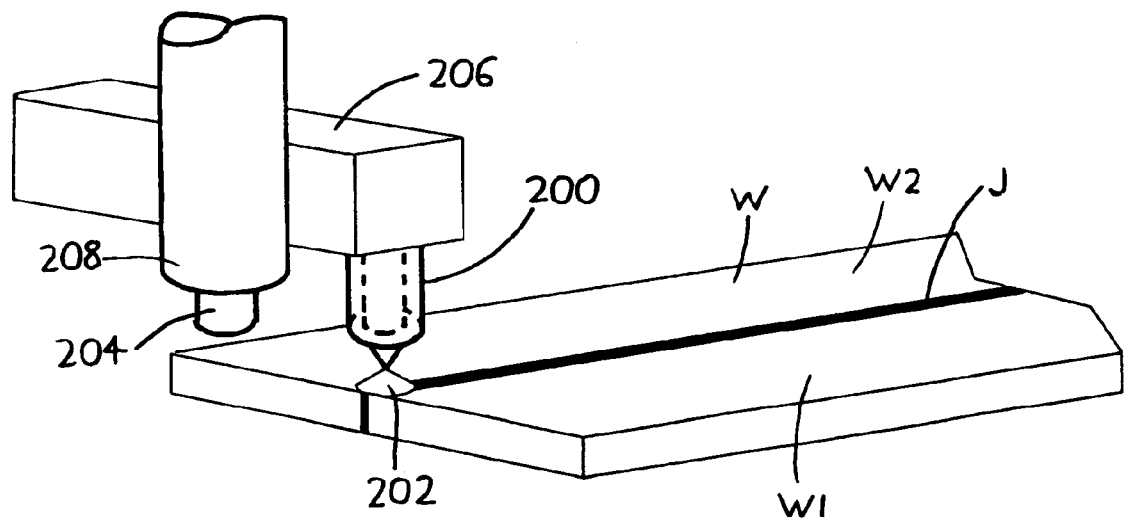
FIGS. 2a–2c presents a perspective view of a first arc-enhanced friction stir welding arrangement which exemplifies the invention, wherein the torch 200 applies an electrical arc 202 to the joint J of the workpiece W, with the joint J subsequently being frictionally stirred by the friction stir welding head 204.
Figure 2B:
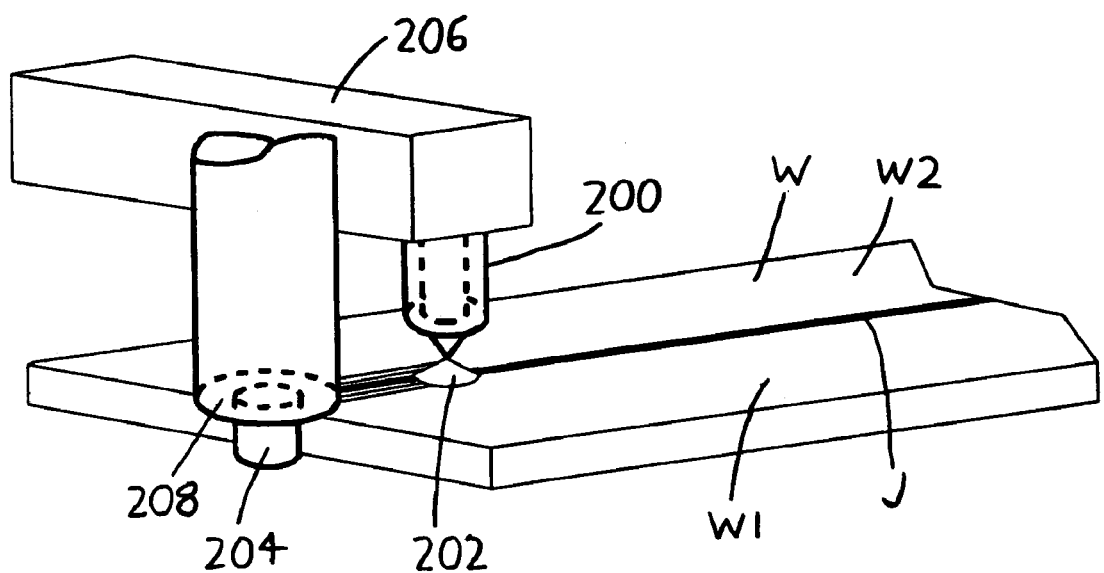
Figure 2C:
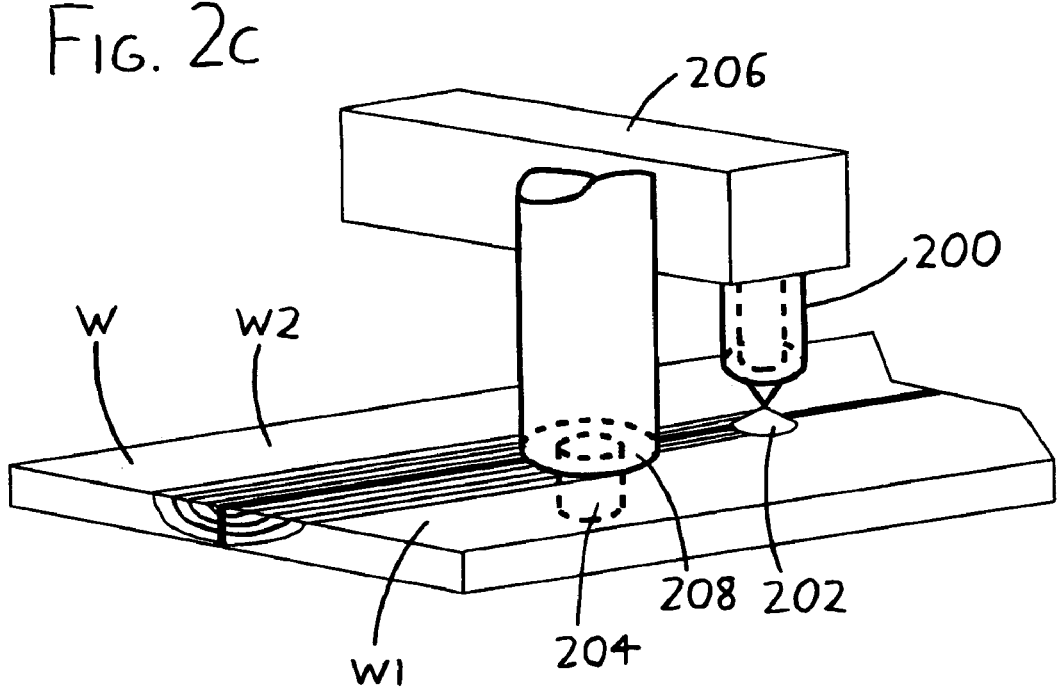

Further details regarding the exemplary versions of the invention depicted in FIGS. 2a–2c and 3 will now be provided, and the reader is encouraged to consult the foregoing Summary of the Invention if basic details are desired.

The invention is usefully implemented in automated or substantially semi-automated form, with a robotic welding unit including both the torch 200/300 and the friction stir welding head 204/304, and with a computer or other controller directing the relative motion of the workpiece W versus the torch 200/300 and the friction stir welding head 204/304 (and also directing the relative motion of the friction stir welding head 204/304 versus the torch 200/300, if any such motion is used). It should be understood that the invention may move the workpiece W with respect to the welding unit (i.e., with respect to the torch 200/300 and the friction stir welding head 204/304), and/or the welding unit may move relative to the workpiece W.

While such an arrangement is not depicted in the accompanying drawings, the workpiece W is preferably situated on a suitable mounting bed which provides one or more of the following functions. First, it holds the sections W1 and W2 of the workpiece W in place during welding, and positions the workpiece W with respect to the welding unit, if the workpiece W is to be moved. Second, it supports the workpiece W beneath the friction stir welding head 204/304 so that the axial force of the head 204/304 onto the workpiece W is supported. Third, it serves to conduct welding current to or away from the workpiece W for effective application of the arc 202 (the arc not being shown in FIG. 3). Such a mounting bed can take a wide variety of forms, and it need not necessarily take the form of an anvil or other monolithic slab. As an example, it could simply take the form of a roller (which is preferably situated beneath the workpiece W to support the force exerted by the friction stir welding head 204/304), or some other structure which only supports the workpiece W at selected points.

The invention may utilize any conventional means for application of an arc 202 (i.e., any conventional torch 200/300) in conjunction with any conventional friction stir welding arrangement, with a common gas-tungsten arc welding (GTAW) torch being a useful option. Inert gas shielding of the arc 202 is recommended, though it may not be necessary to have a gas supply project gas about the arc 202 if the electrode of the torch 200/300 and/or the workpiece W are not susceptible to oxidation.

As depicted in FIGS. 2a–2c and 3, to reduce space and to better allow the torch 200/300 and friction stir welding head 204/304 to rest in close proximity, the torch 200/300 is preferably mounted at the end of an elongated arm 206/306, with the arm 206/306 being oriented at an angle of less than 45 degrees (and preferably nearly parallel) to the plane of the portion of the workpiece W over which the torch 200/300 rests, and with the torch 200/300 being oriented at an angle of greater than 45 degrees (and preferably nearly perpendicular) with respect to the axis of the elongated arm 206/306. In this manner, if the friction stir welding head 204/304 is oriented in a conventional manner with respect to the workpiece W (i.e., perpendicular to the workpiece W or nearly so), the arm 206/306 of the torch 200/300 can rest closely nearby without interfering with the friction stir welding head 204/304, and/or with any actuators that advance and retract the friction stir welding head 204/304 with respect to the workpiece W. GTAW torches having short (approximately 0.5 inch) heads and 90–70 degree mountings, made for welding in narrow/small spaces, are particularly useful.

To effectively weld a given workpiece W, one of the primary parameters that must be determined is the desired arc heat input per unit length of the weld (which can be expressed as IE/V, wherein I is the arc current, E the arc voltage, and V the welding speed). These parameters are preferably selected such that the applied arc 202 will heat a location on the workpiece W to such an extent that the arced location will be partially plastic (but not liquid) when encountered by the friction stir welding head 204/304. Thus, the torch 200/300 need not melt the workpiece W, and it may simply heat the workpiece W such that it softens and allows a reduction in the axial load and torque applied by the friction stir welding head 204/304. This in turn reduces wear on the head 204/304 and allows an increase in welding speed. In essence, the torch 200/300 applies an arc 202 to simply preheat the workpiece (or at most perform partial welding), with the friction stir welding head 204/304 then completing the weld. A GTAW torch carrying up to about 150 A with an arc voltage of approximately 20 volts (and thus approximately 3,000 W of preheating) has been found to be generally sufficient.

Another parameter of importance is the distance (if any) by which the torch 200/300 precedes the friction stir welding head 204/304. This affects the amount of cooling that the arced location will experience before it is frictionally stirred. In general, it is sufficient to have the torch 200/300 precede the friction stir welding head 204/304 by a distance approximately equal to the diameter of the tool shoulder 208/308. Workpieces W formed of materials that have relatively low thermal conductivity, such as steel, stainless steel, and titanium, have a greater tendency to have localized areas melt beneath the arc 202 before the heat conducts to broader areas. In these cases, it is useful to increase the distance between the torch 200/300 and the friction stir welding head 204/304 to allow more time for the heat to diffuse through the workpiece W, and allow the arced area of the workpiece W to solidify, before the workpiece W is frictionally stirred at these areas.

Other factors that influence heating are arc polarity and arc oscillation (i.e., whether the arc 202 is oscillated in some direction, such as perpendicular to the joint J, as the arc 202 is moved along the joint). Regarding arc polarity, DC electronegative (DCEN) welds, which are commonly used with GTAW of steels, tend to be narrow and deep with weld surfaces covered with oxide films. With DC electropositive (DCEP) welds, the welds tend to be wide and shallow with weld surfaces free of oxide films. AC welds, which are commonly used in GTAW of aluminum, tend to have intermediate width, penetration and surface cleanliness. Thus, in corresponding fashion, where the torch 200/300 is a GTAW torch, it is preferred that DCEN be used to weld steels and that AC be used to weld aluminum. Regarding arc oscillation, this can usefully be implemented (particularly with the aforementioned materials of low thermal conductivity) to spread arc heating over a larger area on the workpiece W to plasticize it without melting.

As the friction stir welding head 204/304 follows the path of the torch 200/300, the stirred area preferably overlaps with, but need not be centered about, the path of the arc 202 applied by the torch 200/300. As an example, if a workpiece W includes two materials W1 and W2 having different melting points, the arc 202 may be applied to only the material with the higher melting point, on one side of the joint J, with the friction stir welding head 204/304 then stirring both sides of the joint J. Most preferably, the friction stir welding head 204/304 has its retreating side (rather than its advancing side) situated over the location at which the arc 202 was applied, since this arrangement has been found to often result in less flash formation from the resulting weld.

FIG. 3 depicts the arrangement wherein the arc (not shown) of the torch 300 preheats one side of the workpiece W and frictionally stirs the workpiece W on its other side. This arrangement can more effectively preheat the workpiece W throughout its entire thickness: the arc preheats one side of the workpiece W, whereas the other side of the workpiece W is effectively preheated by the rubbing of the shoulder 308 as the friction stir welding head 304 advances onto the arc-heated area. Since both sides of the workpiece W are preheated, the workpiece W is better plasticized throughout its entire thickness, thereby further easing the frictional stirring of the material of the workpiece W.

The arrangement of FIG. 3 might be modified such that the friction stir welding head 304 is directly opposite the torch 300 (or nearly so), such that the arc and the frictional stirring are effectively applied to the same locations on the workpiece W at the same time. However, this arrangement is not preferred since the position of the torch 300 makes it difficult to situate a support directly opposite the friction stir welding head 304 to counterbalance the forces it exerts (though adjacent supports may be possible). Additionally, the heat generated by the arc will in this case usually not have time to sufficiently disperse that the entire areas being approached by the friction stir welding head 304 will plasticize. As a result, the friction stir welding head 304 may encounter more resistance in the workpiece W. Further, the friction stir welding head 304 will overheat and rapidly wear unless the arc heating is low.

The invention is not intended to be limited to the preferred versions described above, but rather is intended to be limited only by the claims set out below. Thus, the invention encompasses all different versions that fall literally or equivalently within the scope of these claims.

What is claimed is:

1. A welding device for welding a workpiece, the device including:
   a. a torch applying an electrical arc directly to the workpiece, the torch lacking any means for supplying meltable material to the workpiece,
   b. a friction stir welding head spaced from the torch, the friction stir welding head frictionally stirring the workpiece,
   wherein:
   (1) at least one of:
      (a) the torch and friction stir welding head, and
      (b) the workpiece,
      is movable with respect to the other, whereby the torch and friction stir welding head travel about the workpiece;
   (2) the torch preheats the workpiece without supplying any meltable material thereon; and
   (3) the friction stir welding head follows the path of the torch about the workpiece.

2. The welding device of claim 1 wherein the friction stir welding head is movable with respect to the torch, whereby the friction stir welding head may be moved into engagement with the workpiece after the torch has applied the electrical arc to the workpiece.

3. The welding device of claim 1 wherein the friction stir welding head stirs an area of the workpiece overlapping with, but not centered about, the path of the torch.

4. The welding device of claim 3 wherein:
   a. the friction stir welding head rotates with respect to the workpiece, the friction stir welding head thereby having:
      (1) an advancing side moving in the direction of the path along which the friction stir welding head moves along the workpiece, and
      (2) a retreating side moving opposite to the direction of the path along which the friction stir welding head moves along the workpiece; and
   b. the path of the torch is situated closer to the retreating side of the friction stir welding head than the retreating side.

5. The welding device of claim 1 wherein:
   a. the torch is mounted at or near the end of an elongated arm, and
   b. the torch is oriented at an angle of greater than 45 degrees with respect to the axis of the elongated arm.

6. The welding device of claim 1 wherein:
   a. the torch is mounted at or near the end of an elongated arm, and
   b. the arm is oriented at an angle of less than 45 degrees with respect to the surface of the workpiece.

7. The welding device of claim 1 wherein the torch and the friction stir welding head are situated on opposite sides of the workpiece.

8. The welding device of claim 1 wherein the device contacts discrete points spaced about the workpiece, with the friction stir welding head frictionally stirring each point at which the torch applies its electrical arc.

9. The welding device of claim 1 wherein the device contacts a length of the workpiece, with the friction stir welding head frictionally stirring the length along which the torch applies its electrical arc.

10. A method for welding a workpiece, the method including:
    a. applying an electrical arc directly to the workpiece without supplying any meltable material thereon,
    b. frictionally stirring the workpiece at a location spaced from the arc,
    wherein the arc and the frictional stirring are applied along a path on the workpiece, with the frictional stirring following the arc along the path.

11. The method of claim 10 wherein the frictional stirring is applied to the workpiece after the arc is initially applied.

12. The method of claim 10 wherein the frictional stirring is applied to an area of the workpiece larger than the area of the workpiece upon which the arc is applied.

13. The method of claim 10 wherein the frictional stirring is applied to an area of the workpiece overlapping with, but not centered about, the path of the torch.

14. The method of claim 10 wherein:
    a. the workpiece includes at least a pair of objects to be joined, the objects being adjacently situated along a juncture, and
    b. the electrical arc is applied along one side of the juncture; and
    c. the workpiece frictionally stirred along both sides of the juncture, whereby the objects on the opposing sides of the juncture are both stirred.

15. The method of claim 10 wherein the electrical arc does not melt the workpiece.

16. A welding device for welding a workpiece, the device including a welder having:
    a. a torch connected to an electrical power supply, whereby the torch can generate an electrical arc; and
    b. a rotatable friction stir welding head spaced from the torch,
    wherein:
    (1) the welder lacks any means for supplying meltable material to the workpiece:
    (2) at least one of the torch and the friction stir welding head is movable into at least substantially the same plane as the other, and
    (3) at least one of the welder and the workpiece is movable with respect to the other, whereby the welder may be moved along a path defined on the workpiece.

17. The welding device of claim 16 wherein the torch and the friction stir welding head are situated on opposite sides of the workpiece.

18. A method for welding a workpiece, the method including:
    a. applying an electrical arc to a first location situated on the workpiece without melting the workpiece or any material thereon;
    b. removing the electrical arc from the first location, and
    a. subsequently frictionally stirring the workpiece at the first location.

19. The method of claim 18 wherein:
    a. the step of removing the electrical arc from the first location is performed by moving at least one of the arc and the workpiece to apply the arc to a second location situated on the workpiece; and
    b. the workpiece is frictionally stirred at the locations at which the arc is applied.

20. The method of claim 19 wherein the electrical arc is continuously applied along the workpiece from the first location to the second location.

21. The method of claim 19 wherein the electrical arc is not applied to the workpiece between the first location and the second location.

22. The method of claim 18 wherein no meltable material is added to the workpiece at the first location prior to or during application of the electrical arc.

* * * * *